(12) United States Patent
Kapp et al.

(10) Patent No.: US 12,367,194 B1
(45) Date of Patent: Jul. 22, 2025

(54) COMPILATION TECHNIQUES FOR ALGORITHMIC GRAPH PROCESSING IN A RELATIONAL DATABASE

(71) Applicant: Oracle International Corporation, Redwood Shores, CA (US)

(72) Inventors: Hugo Kapp, Zurich (CH); Guido Wachsmuth, Zurich (CH); Laurent Daynes, Saint-Ismier (FR)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/418,718

(22) Filed: Jan. 22, 2024

(51) Int. Cl.
| | | |
|---|---|---|
| *G06F 16/00* | (2019.01) | |
| *G06F 16/242* | (2019.01) | |
| *G06F 16/2452* | (2019.01) | |
| *G06F 16/2453* | (2019.01) | |

(52) U.S. Cl.
CPC .... *G06F 16/24547* (2019.01); *G06F 16/2443* (2019.01); *G06F 16/24526* (2019.01); *G06F 16/24544* (2019.01)

(58) Field of Classification Search
CPC .......... G06F 40/30; G06F 8/24; G06F 16/211; G06F 16/217; G06F 16/24; G06F 16/951; G06F 40/157; G06F 40/211; G06F 40/216; G06F 40/237; G06F 40/295; G06F 40/40; G06F 40/55; G06F 8/36; G06F 8/60; G06F 8/71; G06F 16/258; G06F 16/9535; G06F 9/547; G06F 11/0757; G06F 11/0772; G06F 11/0793; G06F 16/9024; G06F 9/3861; G06F 9/4498; G06F 9/485; G06F 9/5038; G06N 20/00; G06N 5/022; G06Q 10/0631
See application file for complete search history.

(56) References Cited

U.S. PATENT DOCUMENTS

| | | |
|---|---|---|
| 5,379,419 A | 1/1995 | Heffernan et al. |
| 5,594,899 A | 1/1997 | Knudsen |
| 5,596,752 A | 1/1997 | Kundsen |
| 6,081,801 A | 6/2000 | Cochrane et al. |
| 8,046,751 B1 | 10/2011 | Avadhanula |

(Continued)

FOREIGN PATENT DOCUMENTS

CN  107807983 A  3/2018

OTHER PUBLICATIONS

Haprian, U.S. Appl. No. 17/080,700, filed Oct. 26, 2020, Non-Final Rejection, Sep. 9, 2022.

(Continued)

*Primary Examiner* — Shyue Jiunn Hwa
(74) *Attorney, Agent, or Firm* — Hickman Becker Bingham Ledesma LLP

(57) ABSTRACT

A method and apparatus for graph processing in a relational database environment is provided. Preprocessing transformations that enforce restrictions on a high-level domain-specific language (DSL) input is performed to generate one or more graph iterations. At least one query intermediate representation (IR) is generated by lowering the one or more graph iterations into at least one query. The query IR is/are mapped to one or more corresponding relational queries with procedural extensions. The relational queries with procedural extensions are run against relational database management system (RDBMS) tables representing at least one property graph.

20 Claims, 22 Drawing Sheets

(56) References Cited

U.S. PATENT DOCUMENTS

| | | | |
|---|---|---|---|
| 8,631,489 | B2 | 1/2014 | Antonakakis |
| 8,826,255 | B1 | 9/2014 | Avadhanula |
| 9,116,738 | B2 | 8/2015 | Jacob et al. |
| 9,122,513 | B2 | 9/2015 | Jacob et al. |
| 9,454,344 | B1 | 9/2016 | Gao |
| 10,268,610 | B1 | 4/2019 | McKenney |
| 10,409,560 | B1 | 9/2019 | Bebee |
| 10,452,655 | B2 | 10/2019 | Lahorani et al. |
| 10,984,046 | B2 | 4/2021 | Das et al. |
| 11,514,219 | B1 | 11/2022 | Abo Foul et al. |
| 11,704,313 | B1 | 7/2023 | Andrade et al. |
| 2002/0178341 | A1 | 11/2002 | Frank |
| 2004/0194074 | A1 | 9/2004 | Shibayama |
| 2006/0101001 | A1 | 5/2006 | Lindsay et al. |
| 2006/0195463 | A1 | 8/2006 | Bogner |
| 2006/0248285 | A1 | 11/2006 | Petev |
| 2008/0184197 | A1 | 7/2008 | Dobbins et al. |
| 2008/0281801 | A1 | 11/2008 | Larson et al. |
| 2010/0088666 | A1 | 4/2010 | Box et al. |
| 2011/0055511 | A1 | 3/2011 | Mantor |
| 2011/0087670 | A1 | 4/2011 | Jorstad |
| 2011/0119245 | A1 | 5/2011 | Sargeant et al. |
| 2011/0267351 | A1 | 11/2011 | Curbera |
| 2011/0270861 | A1 | 11/2011 | Arshavsky et al. |
| 2013/0006935 | A1 | 1/2013 | Grisby |
| 2013/0066837 | A1 | 3/2013 | Colrain |
| 2013/0297605 | A1 | 11/2013 | Cohen |
| 2013/0339352 | A1 | 12/2013 | Jin |
| 2014/0019490 | A1 | 1/2014 | Roy et al. |
| 2014/0032617 | A1 | 1/2014 | Stanfill |
| 2014/0122812 | A1 | 5/2014 | Hakura |
| 2014/0136553 | A1 | 5/2014 | Jacob et al. |
| 2014/0136555 | A1 | 5/2014 | Jacob et al. |
| 2014/0137129 | A1 | 5/2014 | Jacob et al. |
| 2014/0137130 | A1 | 5/2014 | Jacob et al. |
| 2014/0172810 | A1 | 6/2014 | Paradies |
| 2014/0189665 | A1 | 7/2014 | Hong |
| 2014/0244687 | A1 | 8/2014 | Shmueli |
| 2014/0282574 | A1 | 9/2014 | Marathe |
| 2014/0337276 | A1 | 11/2014 | Iordanov |
| 2014/0351820 | A1 | 11/2014 | Lee |
| 2015/0026158 | A1 | 1/2015 | Jin |
| 2015/0089485 | A1 | 3/2015 | Baskaran |
| 2015/0095698 | A1 | 4/2015 | Ema |
| 2015/0128151 | A1 | 5/2015 | Rak |
| 2015/0370838 | A1 | 12/2015 | Paradies |
| 2016/0063132 | A1 | 3/2016 | Chen et al. |
| 2016/0063191 | A1* | 3/2016 | Vesto ............... G16H 50/50 705/2 |
| 2016/0071233 | A1 | 3/2016 | Macko et al. |
| 2016/0078041 | A1 | 3/2016 | Hartig |
| 2016/0103931 | A1 | 4/2016 | Appavu |
| 2016/0117358 | A1 | 4/2016 | Schmid et al. |
| 2016/0179883 | A1 | 6/2016 | Chen |
| 2016/0188656 | A1 | 6/2016 | Ekanadham et al. |
| 2016/0342708 | A1 | 11/2016 | Fokoue-Nkoutche et al. |
| 2016/0364220 | A1 | 12/2016 | Arai |
| 2017/0046388 | A1 | 2/2017 | Kirk et al. |
| 2017/0060958 | A1 | 3/2017 | Van Rest |
| 2017/0068748 | A1 | 3/2017 | Hu et al. |
| 2017/0091246 | A1 | 3/2017 | Risvik |
| 2017/0147705 | A1 | 5/2017 | Kasperovics et al. |
| 2017/0168779 | A1 | 6/2017 | Sevenich |
| 2017/0286272 | A1 | 10/2017 | Yang |
| 2017/0286273 | A1 | 10/2017 | Lau |
| 2017/0308565 | A1 | 10/2017 | Broll |
| 2018/0067987 | A1 | 3/2018 | Kang et al. |
| 2018/0096000 | A1 | 4/2018 | Harrison et al. |
| 2018/0096035 | A1 | 4/2018 | Kreutzer et al. |
| 2018/0203897 | A1 | 7/2018 | Van Rest |
| 2018/0218088 | A1 | 8/2018 | Fischer et al. |
| 2018/0293329 | A1 | 10/2018 | Yanagisawa |
| 2018/0307777 | A1 | 10/2018 | Sevenich |
| 2018/0329958 | A1 | 11/2018 | Choudhury |
| 2019/0042661 | A1 | 2/2019 | Sevenich |
| 2019/0121810 | A1 | 4/2019 | Zhuang |
| 2019/0205480 | A1 | 7/2019 | Zhang et al. |
| 2019/0213356 | A1 | 7/2019 | Vagujhelyi et al. |
| 2019/0258401 | A1 | 8/2019 | Li |
| 2019/0303506 | A1 | 10/2019 | Bross et al. |
| 2019/0311060 | A1 | 10/2019 | Bross et al. |
| 2019/0340284 | A1 | 11/2019 | Kandukuri |
| 2020/0117762 | A1 | 4/2020 | Haprian |
| 2020/0364268 | A1 | 11/2020 | Xu et al. |
| 2021/0034615 | A1 | 2/2021 | Chen et al. |
| 2021/0064660 | A1 | 3/2021 | Xu et al. |
| 2021/0149854 | A1 | 5/2021 | Barde et al. |
| 2021/0224235 | A1 | 7/2021 | Arnaboldi et al. |
| 2021/0256063 | A1 | 8/2021 | Kasperovics et al. |
| 2022/0129451 | A1 | 4/2022 | Haprian et al. |
| 2022/0129461 | A1 | 4/2022 | Haprian et al. |
| 2022/0129465 | A1 | 4/2022 | Haprian et al. |
| 2022/0245147 | A1 | 8/2022 | Segalini et al. |
| 2024/0265001 | A1* | 8/2024 | Fatahi ............... G06F 16/27 |

OTHER PUBLICATIONS

Arnaboldi, U.S. Appl. No. 16/747,827, filed Jan. 21, 2020, Notice of Allowance, Jun. 9, 2021.

Haprian, U.S. Appl. No. 17/080,719, filed Oct. 26, 2020, Notice of Allowance and Fees Due, Jul. 7, 2022.

Haprian, U.S. Appl. No. 17/080,719, filed Oct. 26, 2020, Non-Final Rejection, Dec. 14, 2021.

Haprian, U.S. Appl. No. 17/080,700, filed Oct. 26, 2020, Notice of Allowance and Fees Due, Sep. 21, 2023.

Haprian, U.S. Appl. No. 17/080,700, filed Oct. 26, 2020, Notice of Allowance and Fees Due, Apr. 25, 2024.

Haprian, U.S. Appl. No. 17/080,700, filed Oct. 26, 2020, Notice of Allowance and Fees Due, Jan. 29, 2024.

Haprian, U.S. Appl. No. 17/080,719, filed Oct. 26, 2020, Notice of Allowance and Fees Due, Oct. 20, 2022.

Haprian, U.S. Appl. No. 17/080,700, filed Oct. 26, 2020, Advisory Action, Mar. 30, 2023.

Kandukuri, U.S. Appl. No. 15/971,644, filed May 4, 2018, Final Office Action, Jul. 10, 2020.

Haprian, U.S. Appl. No. 17/080,700, filed Oct. 26, 2020, Final Rejection, Jan. 18, 2023.

Haprian, U.S. Appl. No. 17/080,698, filed Oct. 26, 2020, Notice of Allowance and Fees Due, Dec. 28, 2022.

Haprian, U.S. Appl. No. 17/080,698, filed Oct. 26, 2020, Notice of Allowance and Fees Due, Sep. 14, 2022.

Haprian, U.S. Appl. No. 17/080,698, filed Oct. 26, 2020, Non-Final Rejection, Dec. 24, 2021.

Haprian, U.S. Appl. No. 17/080,698, filed Oct. 26, 2020, Final Rejection, May 18, 2022.

Dwars, U.S. Appl. No. 16/176,853, filed Oct. 31, 2018, Notice Allowance, Jun. 2, 2020.

Arnaboldi, U.S. Appl. No. 16/747,827, filed Jan. 21, 2020, Office Action, Apr. 21, 2021.

Haprian, U.S. Appl. No. 17/080,700, filed Oct. 26, 2020, Non-Final Rejection, May 25, 2023.

Kapp, U.S. Appl. No. 17/585,146, filed Jan. 26, 2022, Non-Final Rejection, Mar. 31, 2023.

Sevenich, U.S. Appl. No. 15/666,310, filed Aug. 1, 2017, Notice of Allowance, Oct. 28, 2019.

Sevenich, U.S. Appl. No. 14/969,231, filed Dec. 15, 2015, Office Action, Sep. 8, 2017.

Sevenich, U.S. Appl. No. 14/969,231, filed Dec. 15, 2015, Notice of Allowance, Jan. 11, 2018.

Segalini, U.S. Appl. No. 17/162,527, filed Jan. 29, 2021, Notice of Allowance and Fees Due, Aug. 5, 2022.

Segalini, U.S. Appl. No. 17/162,527, filed Jan. 29, 2021, Non-Final Rejection, Mar. 17, 2022.

Segalini et al., U.S. Appl. No. 17/162,527, filed Jan. 29, 2021, Notice of Allowance and Fees Due, Jun. 24, 2022.

Haprian, U.S. Appl. No. 17/080,719, filed Oct. 26, 2020, Notice of Allowance and Fees Due, Aug. 11, 2022.

Kapp, U.S. Appl. No. 17/585,146, filed Jan. 26, 2022, Notice of Allowance and Fees Due, Feb. 22, 2024.

(56) References Cited

OTHER PUBLICATIONS

Sevenich, U.S. Appl. No. 15/666,310, filed Aug. 1, 2017, Office Action, May 29, 2019.
Kapp, U.S. Appl. No. 17/585,146, filed Jan. 26, 2022, Final Rejection, Oct. 12, 2023.
Kapp, U.S. Appl. No. 17/585,146, filed Jan. 26, 2022, Advisory Action, Dec. 4, 2023.
Kapp, U.S. Appl. No. 17/584,262, filed Jan. 25, 2022, Notice of Allowance and Fees Due, Oct. 12, 2023.
Kapp, U.S. Appl. No. 17/584,262, filed Jan. 25, 2022, Non-Final Rejection, Jun. 23, 2023.
Kandukuri, U.S. Appl. No. 15/971,664, filed May 4, 2018, Notice of Allowance, Jan. 14, 2021.
Kandukuri, U.S. Appl. No. 15/971,664, filed May 4, 2018, Notice of Allowance, Sep. 8, 2020.
Kandukuri, U.S. Appl. No. 15/971,664, filed May 4, 2018, Office Action, Apr. 6, 2020.
Kapp, U.S. Appl. No. 17/585,146, filed Jan. 26, 2022, Notice of Allowance and Fees Due, Mar. 13, 2024.
Freeman, Eve, "Getting Started with Neo4j and Cypher", https://www.airpair.com/neo4j/posts/getting-started-with-neo4j-and-cypher, dated Oct. 2016, 12 pages.
"SAP HANA Graph Reference", SAP HANA Platform 2.0 SPS 04 Document Version: 1.1 dated Oct. 31, 2019, SAP.com, 86 pages.
Liu et al., "iBFS: Concurrent Breadth-First Search on GPUs", SIGMOD'16, Jun. 26-Jul. 1, 2016, San Francisco, CA, USA, 14 pages.
Jindal, Alekh et al. "Graph Analytics Using Vertica Relational Database", 2015 IEEE Intl Conf on Big Data (Big Data), Santa Clara, CA, pp. 1191-1200, doi: 10.1109/BigData.2015.7363873, Oct. 2015, 14pgs.
IBM Knowledge Center, "Row ID Values", https://www.ibm.com/support/knowledgecenter/en/SSEPEK_11.0.0/sqlref/src/tpc/db2z_rowidvalues.html, dated Nov. 20, 2019, 3 pages.
Hong et al., "PGX.D: A Fast Distributed Graph Processing Engine", SC '15, dated Nov. 15-20, 2015, Austin, TX, USA, 12 pages.
Hong et al., "Green-Marl: A DSL for Easy and Efficient Graph Analysis", ASPLOS'12 Mar. 3-7, 2012, London, England, UK, 14 pages.
Holsch et al., "An Algebra and Equivalences to Transform Graph Patterns in Neo4j", available: http://ceur-ws.org/Vol-1558/paper24.pdf.
Hassan, Mohamed S., et al., "Empowering In-Memory Relational Database Engines with Native Graph Processing", arXiv:1709.06715v2, Oct. 12, 2017, 15pgs.
Hassan, "Extending In-Memory Relational Database Engines with Native Graph Support", Published in Proceedings of the 21st International Conference on EDBT, https://openproceedings.org/2018/conf/edbt/paper-17.pdf, dated Mar. 2018, 12 pages.
Hassan Chafi et al., "ManagingtheProliferationProblem", OracleLabsperspectiveonlanguage-integratedquerying & data analytics, dated Feb. 2017, 23 pages.
Harshvardhan et al., "KLA: A New Algorithmic Paradigm for Parallel Graph Computations" dated 2014, 23d International Conference on Parallel Architecture and Compliation Techniques, dated 2014, 12 pgs.
Microsoft Docs, "Graph processing with SQL Server and Azure SQL Database",docs.microsoft.com/en-us/sql/relational databases/graphs/sql-graph-overview?view=sql-server-ver15, dated Jun. 26, 2019, 5 pgs.
Fu et al., "Parallel Breadth First Search on GPU Clusters", dated 2014, IEEE, dated 2014, pp. 110-118.
Microsoft.com, "SQL Server 2019" https://www.microsoft.com/en-us/sql-server/sql-server-2019, last viewed on Jan. 29, 2021, 8 pages.
Flores et al., "Semantic Data Management in Graph Databases", Tutorial at ESWC 2014-, dated 2014, 153 pages.
Deutsch et al., "TigerGraph: A Native MPP Graph Database", Jan. 24, 2019, 28 pages.
Databricks, "Graph Analysis Tutorial with GraphFrames", dated Jul. 21, 2020, https://docs.databricks.com/spark/latest/graph-analysis/graphframes/graph-analysis-tutorial.html, 2 pages.
Berry et al., "Software and Algorithms for Graph Queries on Multithreaded Architectures", dated 2007, IEEE, pp. 1-14.
Benzaken et al, "Language-Integrated Queries: a BOLDR Approach", WWW 2018, Lyon, France, Apr. 23-27, 2018.
Beamer et al., "Distributed Memory Breadth-First Search Revisited: Enabling Bottom-Up Search", IEEE, dated 2013 pp. 1618-1627.
Attia et al., "CyGraph: A Reconfgurable Architecture for Parallel Breadth-First Search", dated 2014 IEEE International Parallel & Distributed Processing Symposium Workshops, dated 2014, pp. 228-235.
Apache TinkerPop, "The Gremlin Graph Traversal Machine and Language", tinkerpop.apache.org/gremlin.html, last viewed on Nov. 4, 2020, 6 pages.
Annamalai et al., "PGQL Introduction and Deep Dive", Product Management, Oracle, Jul. 30, 2020, 45 pages.
An Oracle White Paper, "Unleash the Power of Java Stored Procedures", Dated Jun. 2002, 20 pages.
Amazon Neptune, "Overview" https://aws.amazon.com/neptune/, last viewed on Nov. 4, 2020, 20 pages.
Adam et al., "A Comparison of List Schedules for Parallel Processing Systems", Communications of the ACM 17(12):685-690, Dec. 1974, pp. 685-690.
Graph Query Language GQL, "GQL Standard", https://www.gqlstandards.org/home, last viewed on Jan. 29, 2021, 2 pages.
Shang et al., "Catch the Wind: Graph Workload Balancing on Cloud", dated 2013 IEEE 29th International Conference on Data Engineering, dated 2013, pp. 553-564.
Yoo et al., "A Scalable Distributed Parallel Breadth-First Search Algorithm on BlueGene/L", SC 2005 ACM/IEE, pp. 25-25.
Wikipedia, the free encyclopedia, "Subgraph isomorphism problem", https://en.wikipedia.org/wiki/Subgraph_isomorphism_problem, last viewed on Jan. 29, 2021, 4 pages.
Wikipedia, the free encyclopedia, "PageRank", https://en.wikipedia.org/wiki/PageRank, last viewed on Jan. 29, 2021, 16 pages.
Wikipedia, the free encyclopedia, "Isolation (database systems)", https://en.wikipedia.org/wiki/Isolation_(database_systems), last viewed on Jan. 29, 2021, 8 pages.
Wikipedia, the free encyclopedia, "Fetch-and-add", https://en.wikipedia.org/wiki/Fetch-and-add, last viewed on Jan. 29, 2021, 4 pages.
Wikipedia, the free encyclopedia, "Bellman-Ford algorithm", https://en.wikipedia.org/wiki/Bellman%E2%80%93Ford_algorithm, last viewed on Jan. 29, 2021, 6 pages.
Wheatman et al., "Packed Compressed Sparse Row: A Dynamic Graph Representation", Computer Science and Artificial Intelligence Laboratory Massachusetts Institute of Technology, https://ieeexplore.ieee.org/abstract/document/8547566, dated 2018, 7 pages.
Wagner et al., "Language Integrated Query (LINQ)", available: https://learn.microsoft.com/en-us/dotnet/csharp/linq/, Dec. 15, 2023.
Valiyev, Mahammad, "Graph Storage: How Good is CSR Really?", https://github.com/mehemmedv/DB_Imp_Seminar, dated Dec. 10, 2017, 8 pages.
TigerGraph, "The Only Scalable Graph Database for the Enterprise", https://www.tigergraph.com/, last viewed on Nov. 4, 2020, 9 pages.
Tian et al., "IBM Db2 Graph: Supporting Synergistic and Retrofittable Graph Queries Inside IBM Db2", SIGMOD '20: Proceedings of the 2020 ACM SIGMOD International Conference on Management of Data, Jun. 2020, 15 pages.
Michaels, Jan, "Property Graph Data Model—The Proposal", Individual Expert Contribution, dated Jan. 16, 2019, 76 pages.
Sparsity Technologies, "Sparksee User Manual", API, http://www.sparsity-technologies.com/UserManual/API.html, 61 pages, dated 2015.
Zemke, Fred, "Fixed Graph Patterns", ISO/IEC SC32/WG3:ERF-035, dated Sep. 14, 2018, 25 pages.
Segalini et al., "Patent: efficient identification of vertices and edges for graph indexes in an RDBMS", dated Nov. 2015, 12 pages.

(56) References Cited

OTHER PUBLICATIONS

SAP.com, "SAP HANA", Harness the power of an in-memory database with SAP HANA, SAP Business Technology Platform, https://www.sap.com/products/hana.html, last viewed on Jan. 29, 2021, 19 pages.

SAP.com, "SAP HANA Graph Reference", SAP HANA Platform 2.0 SPS 03 Document Version: 1.1 dated Oct. 31, 2018, 84 pages.

SAP HANA, "Graph Workspaces," https://help.sap.com/viewer/f381aa9c4b99457fb3c6b53a2fd29c02/2.0.03/en-US, 1pg.

PGQL, "Property Graph Query Language", http://pgql-lang.org/, last viewed on Nov. 3, 2020, 5 pages.

Padmanabhan, "HDB-Subdue, A Relational Database Approach to Graph Mining and Hierarchical Reduction", Dec. 2005, 99 pages.

Oracle Help Center, "ROWID Pseudocolumn", Database SQL Reference, https://docs.oracle.com/cd/B19306_01/server.102/b14200/pseudocolumns008.htm, dated Nov. 20, 2019, 2 pages.

Oracle Database MLE Documentation, http://www.oracle.com/technetwork/database/multilingual-engine/documentation/index.html, dated 2017, 2 pages.

Oracle Database MLE 0.2.7, Oracle Database Multingual Engine (MLE), https://oracle.github.io/oracle-db-mle/releases/0.2.7/, dated 2017, 5 pages.

Ong et al., The SQL++ Query Language: Configurable, Unifying and Semi-structured, available: https://arxiv.org/abs/1405.3631, Dec. 14, 2015.

Neo4j Graph Platform, "What is Neo4j?", https://neo4j.com/, last viewed on Nov. 4, 2020, 14 pages.

Neo4j Graph Database Platform, "Cypher Query Language", https://neo4j.com/developer/cypher/, dated Nov. 4, 2020, 7 pages.

Stoica, Radu-Alexandru, "R2PG-DM: A Directly Mapping Relational Databases to Property Graphs", diss. Master's thesis, Eindhoven Univ. of Technology 2019, https://ceur-ws.org/Vol-2369/short06.pdf, Jul. 2019, 24pgs.

\* cited by examiner

310

```
foreach(v: V(G)) {
    double inSum = sum{w -[e]-> _ : E(G, v)} {
        ...
    };
    // x is a constant value wrt to the iteration
    double newRankVal = x + 0.85d*inSum;
    double rankVal = v.rank;
    diff += |newRankVal-rankVal|;
    v.newRank = newRankVal;
}
```

330

```
foreach(v: V(G)) {
    double inSum = sum{w -[e]-> _ : E(G, v)} {
        ...
    };
    // x is a constant value wrt to the iteration
    v.newRank = x + 0.85d*inSum;
}
diff = sum {v: V(G)} {
    let
        double newRankVal = v.newRank;
        double rankVal = v.rank;
    in
        |newRankVal-rankVal|
};
```

Fig. 3

```
procedure pagerank(graph G; vertexProp<double> rank)
vertexProp<double> newRank;
double diff;
long N = G.numVertices();
setProperty(G, rank, 1d/(double) N);
double x = 0.15d/(double) N;
do {
    diff = 0.0;
    foreach(v: V(G)) (true) {
        double inSum =
            sum(w -[e]-> _ : E(G, v)) (true) {
                let
                    double rankVal = w.rank;
                    long degree = outDegree(G, w);
                in
                    rank/(double)degree
            };
        double newRankVal = x + 0.85d*inSum;
        double rankVal = v.rank;
        diff += |newRankVal-rankVal|;
        v.newRank = newRankVal;
    }
} while (diff > 0.001d);
```

Fig. 4

```
foreach(v: V(g)){
    double inSum = sum{w_[e]-> _: E(G, v)};
    ...
    v.newRank = x + 0.85d*inSum;
}
```

```
foreach ([Vt: VT(g)] [v: V(g)]){
    double inSum =
        SUM {Sw_[EM]-> _: ET(G, Vt)} {w_[e]-> _: E(G, v)};
    ...
    v.newRank = x + 0.85d*inSum;
}
```

Fig. 5

```
procedure pagerank(graph G; vertexProp<double> rank)
   vertexProp<double> newRank;
   double diff;
   long N = G.numVertices();
   setProperty(G, rank, 1d/(double) N);
   double x = 0.15d/(double) N;
   do {
     diff = 0.0d;
     foreach (Vt: VT(G)] (v: V(Vt)) {
       double inSum =
         sum [Sw -(Ew)-> _: ET(G, Vt)] (w -[e]-> _: E(Ew, v)) {true} {
           let
             double rankVal = w.rank;
             long degree = outDegree(G, w);
           in
             rankVal/(double)degree
         };
       v.newRank = x + 0.85d*inSum;
     };
     diff = sum [Vt: VT(G)] (v: V(Vt)) {
       let
         double newRankVal = v.newRank;
         double rankVal = v.rank;
       in
         |newRankVal-rankVal|
     };
     copyProperty(G, rank, newRank);
   } while (diff > 0.001d);
```

Fig. 6

```
foreach [table_iterator] (iterator) (filter) {
    iterator.property = expression;
}
```

⟶

```
for-all [table_iterator] {
    update_operator into table
    set property := expression
    from (
        domain_query
    )
    where filter
}
```

Fig. 8

```
select reduction_operator(expression)
into var
from {
    // union across all vertex tables V of the graph G
    union-all [V: VT(G)] {
        // domain query
        ...
    }
};
```

Fig. 9

```
// iterate over all vertex tables V of the graph G
for-all [V: VT(G)] {
    update into table set prop := expression
    from {
        // domain query
        ...
    }
};
```

Fig. 10

| id(v) |
|---|
| $v_1$ |
| $v_2$ |
| $v_3$ |

1110

```
select id(v)
from V v;
```

| src_vertex(e) | id(e) | dst_vertex(e) |
|---|---|---|
| $v_1$ | $e_1$ | $v_1$ |
| $v_1$ | $e_2$ | $v_2$ |

```
// iteration over the outgoing neighbors w of a vertex v
select *
inner join on _ -(e:E)-> (w:D)
group by v
from (
    // vertex tables
    select id(w)
    from D w
), (
    // edge tables
    select src_vertex(e), id(e), dst_vertex(e)
    from E e
)
```

Fig. 13

| src_vertex(e) | id(e) | dst_vertex(e) |
|---|---|---|
| $v_1$ | $e_1$ | $v_1$ |
| $v_1$ | $e_2$ | $v_2$ |
| $v_2$ | NULL | NULL |
| $v_3$ | $e_4$ | $v_2$ |

Fig. 14

```
select *
join on (v:V) -(e:E)-> _  // can be a left outer join or an inner join
from (
    // vertices v (outer iteration)
    select id(v)
    from V
), (
    // neighbors w (nested iteration)
    select *
    inner join on _ -(e:E)-> (w:D)
    from (
        select id(w)
        from D
    ), (
        // edges e
        select src_vertex(e), id(e) dst_vertex(e)
        from E
    )
)
```

Fig. 15

```
for-all [V_t: VT(G)] {
   create property
   set deg := x
   from (
      select sum (1) as x, id(v)
      group by v
      from (
         union-all [_-[Et]-> D_w: ET(G, Vt)] {
            select *
            left outer join on (v:Vt) -(e:Et)-> from (
               select id(v)
               from Vt v
            ), (
               select *
               inner join on _ -(e:Et)-> (w:Dt)
                  from (
                     select id(w)
                     from Dt w
                  ), (
                     select src_vertex(e), id(e)
dst_vertex(e)
                     from Et e
                  )
            )
         }
      );
   };
```

Fig. 16

```
for-all (V_t: VT(G)) {
  create property
  set deg := x
  from (
    select (long) sum (1) as x, id(v, V_t)
    group by v
    drop by w, e_w
    from (
      union-all (_-[E_w]-> D_w: ET(G, V_t)) {
        select *
        inner join on (v:V_t) -(e_w:E_w)-> _
        from (
          select id(v, V_t)
          from V_t v
        ), (
          select *
          inner join on _ -(e_w:E_w)-> (w:D_w)
            from (
              select id(w, D_w)
              from D_w w
            ), (
              select id(e_w, E_w), srckeys(e_w, E_w),
dstkeys(e_w, E_w)
              from E_w e_w
            )
        )
      }
    )
  );
  create property
  set deg := x
  from (
    select 0 as x, id(v, V_t)
    from V_t v
    where id(v, V_t) not in (
      union-all (E_t: ET(G)) {
        select srckeys(e, E_t)
        from E_t e
      }
    )
  );
};
```

Fig. 17

```
procedure pagerank(graph G; vertexProp<double>
rank) {
  vertexProp<double> newRank;
  double diff;
  long N = G.numVertices();
  setProperty(G, rank, 1d/(double) N);
  double x = 0.15d/(double) N;
  do {
    diff = 0.0d;
    foreach [Vt: VT(G)] (v: V(Vt)) {
      double inSum =
        sum  [St -[Et]-> _: ET(G, Vt)] (w -[e]->
_: E(Et, v)) (true) {
          let
            double rankVal = w.rank;
            long degree = outDegree(G, w);
          in
            rankVal/(double)degree
        };
      v.newRank = x + 0.85d*inSum;
    }
    diff = sum [Vt: VT(G)] (v: V(Vt)) {
      let
        double newRankVal = v.newRank;
        double rankVal = v.rank;
      in
        |newRankVal-rankVal|
    };
    copyProperty(G, rank, newRank);
  } while (diff > 0.001d);
}
```

Fig. 18

```
procedure pagerank(graph G; vertexProp<double> rank) {
  vertexProp<double> newRank;
  double diff;
  long N = G.numVertices();
  setProperty(G, rank, 1d/(double) N);
  double x = 0.15d/(double) N;
  do {
    diff = 0.0d;
    for-all [Vt: VT(G)] {
      update into table
      set newRank := x + 0.85d*inSum
      from (
        select [double] sum (rankVal/degree) as inSum, id(v)
          group by v
          from (
            union-all [St -[Et]-> _: ET(G, Vt)] {
              select *
              left outer join on _ -(e:Et)-> (v:Vt)
              from (
                select id(v, Vt)
                from Vt v
              ), (
                select *
                inner join on (w:St) -(e:Et)-> _
                  from (
                    select id(w), w.rank as rankVal, outDegree(G, w) as degree
                    from St
                  ), (
                    select src_vertex(e), id(e) dst_vertex(e)
                    from Et
                  )
              )
            }
          )
      )
    };
    select [double] sum (|newRankVal-rankVal|)
    into diff
    from (
      union-all [Vt: VT(G)] {
        select v.newRank as newRankVal, v.rank as rankVal
        from Vt v
      }
    );
    copyProperty(G, rank, newRank);
  } while (diff > 0.001d);
}
```

Fig. 19

```
SELECT aggregation_operator(...)
FROM VT v;
```

Fig. 20

```
INSERT INTO ...
SELECT ...
FROM ...;
```

Fig. 21

```
INSERT INTO ...
SELECT ...
FROM (
  SELECT SUM(...) AS sum_ FROM (
    ...
  )
  GROUP BY ...
);
```

Fig. 22

```
PROCEDURE pagerank (g IN GRAPH_TYPE, rank IN OUTPUT_VERTEX_PROPERTY_TYPE) IS
  BEGIN
    DECLARE
      --========= QUERY GENERATION PROCEDURE DEFINITIONS =========
      PROCEDURE generate_updateQuery IS
        BEGIN
          ...
        END;
      PROCEDURE generate_aggregateQuery IS
        BEGIN
          ...
        END;
      --========= QUERY EXECUTION PROCEDURE DEFINITIONS =========
      PROCEDURE execute_updateQuery (...) IS
        BEGIN
          ...
        END;
      PROCEDURE execute_aggregateQuery (...) IS
        BEGIN
          ...
        END;
    BEGIN
      -- query generation procedures are called at the beginning of the algorithm
      generate_updateQuery();
      generate_aggregateQuery();
      --========= ALGORITHM CORE =========
      DECLARE
        ...
      BEGIN
        ...
        -- query execution procedures are called at the iteration's position in the algorithm
        execute_updateQuery(...);
        execute_aggregateQuery(...);
      END;
    END;
  END;
END;
/
show errors;
```

Fig. 23

```
FOR VTi IN all vertex tables LOOP
   -- SELECT query for VTi
   selectquery := ...
   -- UNION ALL over tables
   aggrquery := aggrquery || ' UNION ALL ' || selectquery;
END LOOP;
aggrquery := 'SELECT SUM(..) FROM (' || aggrquery || ')';
```

Fig. 24

```
// initial update
FOR VTi IN all vertex tables LOOP
   -- Generate DML for VTi
   dml := 'INSERT INTO ' || VTi || ' ...';
   ...
END LOOP;

// partial update
FOR VTi IN all vertex tables LOOP
   -- Generate DML for VTi
   dml := 'MERGE INTO ' || VTi || ' ...' || ' WHERE ' || ... ;
   ...
END LOOP;
```

Fig. 25

```
PROCEDURE pagerank (g IN GRAPH_TYPE, rank IN OUTPUT_VERTEX_PROPERTY_TYPE) IS
BEGIN
  DECLARE
    ---------- QUERY GENERATION PROCEDURE DEFINITIONS ----------
    computeNewRank DML_LIST := NULL;
    calculateDiff SQL_STATEMENT := '';
    ---------- GENERATION OF computeNewRank UPDATE QUERY ----------
    PROCEDURE generate_computeNewRank IS
      ...
    END;
    ---------- GENERATION OF calculateDiff AGGREGATION QUERY ----------
    PROCEDURE generate_calculateDiff IS
      vertex_tables VERTEX_TABLES_SET;
      VTi TABLE_ID;
      BEGIN
        vertex_tables := all_vertex_tables(G);
        FOR VTi IN all_vertex_tables LOOP
          DECLARE
            t VERTEX_TABLE;
            stmt SQL_STATEMENT;
          BEGIN
            stmt := generate_query(G, VTi, new_rank, rank);
            stmt := 'SELECT ' || ('v.' || VTi.property_name(newRank)) || ' as new_rank, ' || ('v.' || VTi.property_name(rank)) || ' as rank') || ', 1 AS vexists FROM (' || stmt || ') v';
            union_all(calculateDiff, stmt_0);
          END;
          i_3 := ts_3.NEXT(i_3);
        END LOOP;
        calculateDiff := 'SELECT ' || generate_aggregations('SUM', 'ABS(new_rank - rank)') || ' FROM (' || calculateDiff || ')';
      END;
    ---------- QUERY EXECUTION PROCEDURE DEFINITIONS ----------
    PROCEDURE execute_computeNewRank (x IN DOUBLE) IS
      execute_update_query(computeNewRank);
    END;
    PROCEDURE execute_calculateDiff (diff IN DOUBLE) IS
      BEGIN
        execute immediate calculateDiff INTO diff;
      END;
  BEGIN
    generate_computeNewRank();
    generate_calculateDiff();
    ---------- ALGORITHM CORE ----------
    DECLARE
      diff DBMS_OGA_VTL.OX_DOUBLE_T := 0.0d;
      N DBMS_OGA_VTL.OX_LONG_T := 0;
      x DBMS_OGA_VTL.OX_DOUBLE_T := 0.0d;
    BEGIN
      cnt := 0;
      n := DBMS_OGA_VTL.get_num_vertices(G);
      x := 0.15d/(double) N;
      LOOP
        BEGIN
          execute_computeNewRank(x);
          execute_calculateDiff(diff);
        END;
        EXIT WHEN NOT (diff > 0.001d);
      END LOOP;
    END;
  END;
END;
/
show errors;
```

Fig. 26

COMPILATION TECHNIQUES FOR ALGORITHMIC GRAPH PROCESSING IN A RELATIONAL DATABASE

RELATED APPLICATIONS

U.S. patent application Ser. No. 17/080,698 filed Oct. 26, 2020, entitled "EFFICIENT COMPILATION OF GRAPH QUERIES ON TOP OF SQL BASED RELATIONAL ENGINE," by Vlad Haprian, et al., now U.S. Pat. No. 11,567,932.

U.S. patent application Ser. No. 17/080,700 filed Oct. 26, 2020, entitled "EFFICIENT COMPILATION OF GRAPH QUERIES INCLUDING COMPLEX EXPRESSIONS ON TOP OF SQL BASED RELATIONAL ENGINE," by Vlad Haprian, et al.

U.S. patent application Ser. No. 17/080,719 filed Oct. 26, 2020, entitled "EFFICIENT COMPILATION OF GRAPH QUERIES INVOLVING LONG GRAPH QUERY PATTERNS ON TOP OF SQL BASED RELATIONAL ENGINE," by Vlad Haprian, et al., now U.S. Pat. No. 11,507,579.

U.S. patent application Ser. No. 17/584,262 filed Jan. 25, 2022, entitled "INLINE GRAPH ALGORITHM EXECUTION WITH A RELATIONAL SQL ENGINE," by Hugo Kapp, et al.

U.S. patent application Ser. No. 17/585,146 filed Jan. 26, 2022, entitled "USING TEMPORARY TABLES TO STORE GRAPH ALGORITHM RESULTS FOR A RELATIONAL DATABASE MANAGEMENT SYSTEM," by Hugo Kapp, et al.

FIELD OF THE INVENTION

Various examples in the disclosure that follows relates to providing compilation patterns for algorithmic graph processing in a relational database management system (RDBMS), where the pattern translates iteration over heterogeneous graphs into a procedural extension of a structured query language (SQL).

BACKGROUND

Graph analytics is becoming an essential tool for data analytics. Relational databases increasingly allow for users to define property graphs from relational tables and to process them using graph pattern matching queries and graph algorithms.

To execute graph algorithms on data stored in a relational database, a typical solution would be to first transfer this data to a graph database which would better represent the graph structure of the data. However, several issues arise with this approach, for example, non-guarantee of data consistency, overhead associated with transferring data out of the relational database, etc. There may also be legal and/or security concerns with transfer of data. This approach can also create a problem when data that resides in a relational database cannot be moved to a graph database.

Alternative solutions include working directly on the relational database, using relational queries to incorporate the programming features of the database. This presents several challenges including, for example, heterogeneity of real-life data, which requires graph representations to have multiple types of vertices and edges stored across multiple tables. This makes queries difficult to write and difficult to maintain. Another challenge is that the graph's underlying table structure is unknown until runtime, which is problematic for graph algorithms that are typically agnostic with regard to the structure of the graph but would have to be adapted for every graph.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Preprocessing transformations that enforce restrictions on a high-level domain-specific language (DSL) file are performed to generate one or more graph iterations. At least one query intermediate representation (IR) is generated by lowering the one or more graph iterations into at least one query. The query IR is/are mapped to one or more corresponding relational queries with procedural extensions. The relational queries with procedural extensions are run against relational database management system (RDBMS) tables representing at least one property graph. The term procedural extension refers to a function, module, routine, or set of database statements that include procedural constructs, such as while loops and if and if-else blocks. Procedural extensions may be defined by a DBMS and compiled and executed by a DBMS. Database objects of the DBMS, such as vertex and edge tables, may be validly referenced by statements in procedural extension. Examples of procedural extensions include Oracle's PL/SQL, IBM's SQL PL, and Microsoft's T-SQL.

In an example, the one or more graph iterations comprise at least iterations for property updates where the iterations for the property updates occur over the structure of a graph, or a subset of the graph and the result is one or more updates to a value of a property assigned for at least one vertex or edge. In an example, name abstractions and for loops are used during the one or more graph iterations over graph tables corresponding to the property updates.

In an example, the one or more graph iterations comprise at least iterations for aggregations where reduction operations are performed over vertices or edges of a graph or subset of the graph and the result is stored as a scalar variable. In an example, name abstractions and for loops are used during the one or more graph iterations over graph tables corresponding to the aggregations.

In an example, the preprocessing transformations comprise at least transforming an operation in the DSL input corresponding to multiple property updates to separate iterations to perform one property update each. In an example, the query IR is syntactically similar to a structured query language (SQL) query and includes additional constructs. In an example, the relational queries with procedural extensions comprise a graph-specific table structure based on information extracted from graph metadata. In an example, the relational queries comprise heterogeneous operators.

BRIEF DESCRIPTION OF THE DRAWINGS

In the drawings:

FIG. 3 provides an example code transformation of a graph iteration that is split.

FIG. 4 provides a PageRank example corresponding to the graph iteration split of FIG. 3.

FIG. 5 is an example of a graph iteration before and after making explicit a heterogeneous table iteration.

FIG. 6 provides a PageRank example corresponding to the graph iteration of FIG. 4.

FIG. 8 is an example domain statement obtained by translating a property update's iterator into its corresponding construct.

FIG. 9 is an example, in the query-based representation, the heterogeneous nature of the graph is maintained with the use of heterogeneous operators.

FIG. 10 is an example, where for property updates, the heterogeneous operator used can be FOR ALL because it represents separate property updates per vertex or edge table and wraps the property update query in SQL.

FIG. 11 is an example vertex table.

FIG. 12 is an example vertex and edge table.

FIG. 13 provides example code for a neighbor iteration query.

FIG. 14 is an example vertex and edge table.

FIG. 15 is example code for a nested neighbor iteration.

FIG. 16 is example code for a nested aggregation using a LEFT OUTER JOIN.

FIG. 17 is example code for a nested aggregation using an INNER JOIN.

FIG. 18 illustrates example code for a PageRank algorithm before a query IR translation.

FIG. 19 illustrates example code for a PageRank algorithm after a query IR translation.

FIG. 20 provides an example aggregation query.

FIG. 21 provides an example property update query.

FIG. 22 provides an example property update query with a nested aggregation

FIG. 23 provides an example of generated PL/SQL code.

FIG. 24 provides example code for an aggregation query with a heterogeneous operator.

FIG. 25 provides example code for a property update query with a heterogeneous operator.

FIG. 26 provides example generated procedural SQL code for the PageRank algorithm using the approach described (some parts of the code are omitted for conciseness).

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The solutions described herein that avoid the problems described above is to provide a compiler that transforms an algorithm expressed in high-level domain specific language (DSL) for algorithmic graph processing into relational queries with procedural extensions. Both the source definition of the algorithm and the executable code generated by the compiler are generic with regard to the graph. This can be supported by a runtime application program interface (API) that provides detailed metadata for property graphs using a property graph model.

General Overview

A graph is a data structure used to model relationships between entities. A graph consists of a set of vertices (corresponding to entries) and a set of edges (corresponding to relationships). When data or a specific application has many relevant relationships, the data may be represented by a graph.

Conceptually, graph processing systems can be in one of two categories: graph analytics and graph querying. Graph analytics systems extract information hidden in the relationships between the entities by iteratively traversing relevant subgraphs or the entire graph. Graph querying systems extract structural information from the data by matching patterns on the graph topology.

Various examples of compilation techniques for translating an algorithmic graph processing DSL into a procedural extension of relational queries are described. In general, two concepts guide the processing of property graphs: 1) property updates and 2) aggregations. As described in greater detail below, there can be three compilation phases: 1) pre-processing transformations that enforce restrictions and support generation of relational queries; 2) an intermediate representation in which graph iterations are reduced to a query-based representation that also acknowledges the heterogeneous nature of the graphs; and 3) mapping of the intermediate representations into relational database queries with procedural extensions that can be run against property graphs of various table structures.

Figure 1:
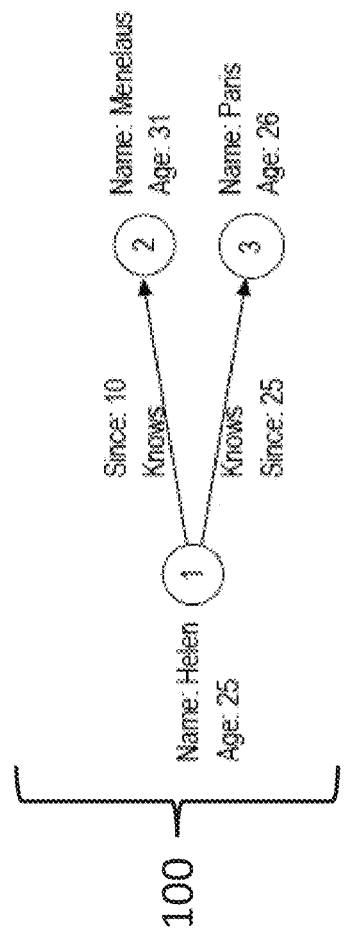
FIG. 1 illustrates an example property graph.

A property graph data model allows vertices and edges in a graph to have arbitrary properties as key-value pairs. FIG. 1 illustrates an example property graph. Example graph 100 can be stored in a RDBMS as persons table 150 and knows table 160. Each vertex has a unique identifier (e.g., Vid) in the vertex table (e.g., Persons table 150) where it is stored. Similarly, each edge has a unique identifier (e.g., $E_{id}$) in the edge table (e.g., Knows table 160) where it is stored. The edge table can be used for matching patterns; the vertex and edge tables can then be used for accessing the desired information when a pattern is matched. The RDBMS keeps track of the reference tables by each edge table in order to be able to reconstruct the graph structure.

In an example, the graphs are heterogeneous graphs. A heterogeneous graph can have nodes and edges of different types. Nodes and edges of different types have independent ID space and feature storage. Heterogeneous graphs can be stored across multiple vertex and edge tables.

In various examples, because information about the graph definition is not known at compile time, query generation can be accomplished at two levels. First, at compile time, the graph algorithm is translated into a template of corresponding queries that contains calls to a generic code-generation API. This template acknowledges graph heterogeneity but is generic with regard to the graph's underlying table structure. Second, at run time, the calls transform the template into executable queries adapted for the graph's specific table structure based on information extracted from graph metadata.

This approach provides unique advantageous features including, for example, a compilation pattern for automatically translating an algorithmic graph processing DSL into a procedural extension of relation queries, a compilation pattern that focuses on two property graph-specific concepts (property updates and aggregations), and it allows a two-level query generation (compile-time generation that acknowledges the graph heterogeneity but makes no assumptions about the underlying table structure, and run time generation that dynamically composes queries specific to the table structure of the input graph).

Conceptual Overview

As discussed above, the approaches described herein provide automated compilation patterns for translating graph algorithms into relational queries with procedural extensions. In an example, users can encapsulate graph processing algorithms in a graph-specific language that provides high-level abstractions over graph structure and relational semantics, thus making graph algorithms easier to write and to maintain. This improves operational efficiency and/or decreases resource (e.g., power) utilization. In an example, the compilation patterns automatically translate graph algorithms into relational queries with procedural extensions that can be executed in an existing RDBMS and make use of the query optimizations provided by query optimization capability of a RDBMS.

Figure 2:
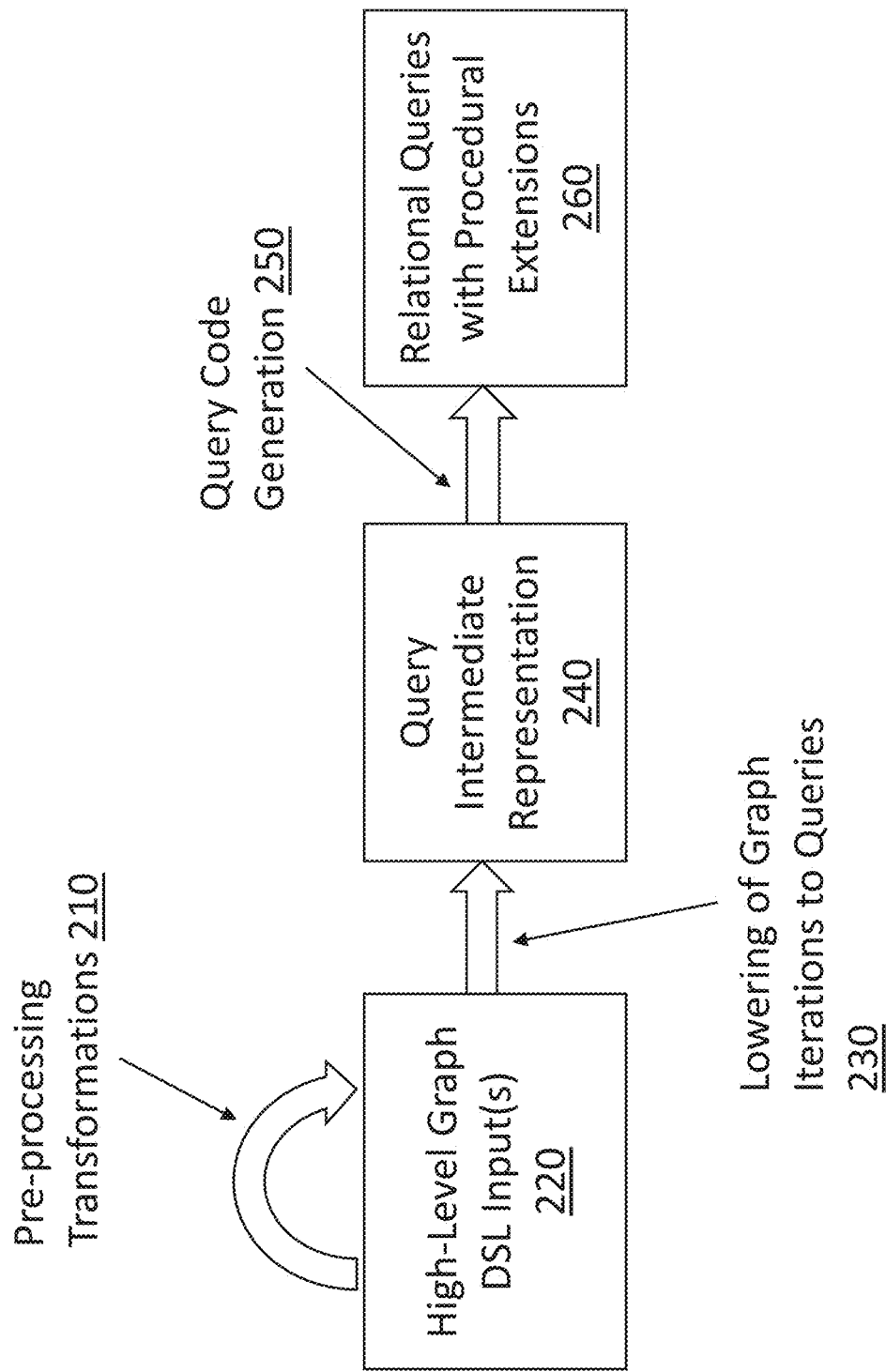
FIG. 2 is a block diagram of a compilation pipeline for providing compilation patterns for algorithmic graph processing in a relational database management system (RDBMS).

FIG. 2 is a block diagram of a compilation pipeline for providing compilation patterns for algorithmic graph processing in a relational database management system (RDBMS). The pipeline of FIG. 2 can be utilized with some domain-specific language (DSL) designed for algorithmic graph processing. As the graph-specific constructs of the DSL (220) are semantically distant from those of relational queries, the pipeline of FIG. 2 generates an intermediate representation (query intermediate representation 240) to close the gap. In this representation, graph iterations assume a query-based, SQL-like structure, thus paving the way for relational query generation. Query code generation 250 transforms query intermediate representation 240 to relational database queries with procedural extensions 260.

Pre-Processing Transformations

In the example of FIG. 2, pre-processing transformations 210 are performed on high-level DSL input 220. In an example, a PageRank approach is utilized as part of pre-processing transformations 210. In general, the PageRank approach measures the importance of an item (e.g., web page, node, document) based on the quality and quantity of links (e.g., web links, vertices, other documents) linking from or pointing to (or referencing) the item.

The functionality of the compilation pipeline of FIG. 2 focuses on iterations over graphs. Non-graph specific constructs are less relevant as they can more easily find their semantic equivalents in the target language. In the examples that follow, there can be two types of iterations over the graphs. The first type of iteration is for property updates where the iterations occur over the structure of a graph, or a subset of the graph and the result is one or more updates to the value of a property assigned for each vertex or edge. The second type of iteration is for aggregations where reduction operations are performed over the vertices or edges of a graph (or subset of the graph) and the result is stored as a scalar variable.

In an example, for the graph to be processed in the pipeline of FIG. 2, vertices and edges can be associated with arbitrary properties using, for example, a property graph model. In the database, property graphs are stored across multiple vertex and edge tables, thus allowing for heterogeneous graphs. Vertex tables have key columns representing vertex identifiers. Each edge table has a relationship to a source vertex table and a destination vertex table. In an example, properties that are computed by the graph analysis are stored in side tables. A side table extends one of the base tables of the graph (either a vertex table or an edge table) by storing the key value from its base table. For the sake of simplicity, a side table can only store one property.

Various details and applications of the property graph model are provided in U.S. Patent Applications U.S. patent application Ser. No. 17/080,698 filed Oct. 26, 2020, entitled "EFFICIENT COMPILATION OF GRAPH QUERIES ON TOP OF SQL BASED RELATIONAL ENGINE," by Vlad Haprian, et al., now U.S. Pat. No. 11,567,932, U.S. patent application Ser. No. 17/080,700 filed Oct. 26, 2020, entitled "EFFICIENT COMPILATION OF GRAPH QUERIES INCLUDING COMPLEX EXPRESSIONS ON TOP OF SQL BASED RELATIONAL ENGINE," by Vlad Haprian, et al., U.S. patent application Ser. No. 17/080,719 filed Oct. 26, 2020, entitled "EFFICIENT COMPILATION OF GRAPH QUERIES INVOLVING LONG GRAPH QUERY PATTERNS ON TOP OF SQL BASED RELATIONAL ENGINE," by Vlad Haprian, et al., now U.S. Pat. No. 11,507,579, application Ser. No. 17/584,262 filed Jan. 25, 2022, entitled "INLINE GRAPH ALGORITHM EXECUTION WITH A RELATIONAL SQL ENGINE," by Hugo Kapp, et al., U.S. patent application Ser. No. 17/585,146 filed Jan. 26, 2022, entitled "USING TEMPORARY TABLES TO STORE GRAPH ALGORITHM RESULTS FOR A RELATIONAL DATABASE MANAGEMENT SYSTEM," by Hugo Kapp, et al., which are incorporated by reference herein, and the last two of which describe side tables.

In an example, to account for constraints corresponding to relational queries in a relational database environment, one or more of the following transformations (e.g., pre-processing transformations 210) can be applied. In an example, the preprocessing step is performed because only one property per side table is stored. Hence, the preprocessing addresses both a RDBMS limitation, as well as a side table limitation. Note that the side table limitation is not a necessary restriction. That is, the approach described in this herein could be provided without this side table limitation.

In an example, iterations perform one property update at most. Thus, iterations with multiple property updates are split into multiple iterations with one property update each. This relates to how properties are stored in the database in this example. Because a side table can store only one property, and data manipulation language (DML) statements can modify one table at a time, multiple property updates are not supported.

In an example, iterations can only combine property updates and aggregations if the aggregation is nested within the property update and the result is used to update the property. In any other scenario where an iteration performs both an aggregation and a property update it is split. In an example, when a property being updated appears in the update expression, a deferred assignment can be used. A deferred assignment computes an update expression based on the value of that property before the update. This is semantically equivalent to computing and storing the new property value for each vertex, then performing the update of the original property. An implementation may have better runtime and memory characteristics than this semantic description.

The transformation to establish this restriction is a top-down traversal to replace iterations that contain multiple property update statements with multiple iterations that contain a single property update statement. In an example, this process may create new properties that store local values computed in the initial iteration that are used in more than one split iteration. This is shown in FIG. 3 with the 'newRank' property. An implementation may use a variety of heuristics and static analyses to try to reduce the number of new properties introduced by this pre-processing phase.

FIG. 3 provides an example code transformation of a graph iteration that is split. Code segment 310 represents original code (e.g., from high-level graph DSL input 220) before pre-processing transformations (e.g., 210). Code segment 330 represents transformed code (e.g., as a result of pre-processing transformations 110). FIG. 4 provides a PageRank example corresponding to the graph iteration split of FIG. 3.

In the database, graphs are stored across multiple vertex and edge tables. Graph heterogeneity is made explicit through the addition of table iterators for iterating over multiple vertex and/or edge tables. In an example, the transformation to explicate table iteration traverses the program and replaces each iterator with its heterogeneous counterpart. FIG. 5 is an example of a graph iteration before (510) and after (530) explicating a heterogeneous table iteration. FIG. 6 provides a PageRank example corresponding to the graph iteration of FIG. 4.

Query Intermediate Representations

After applying the necessary transformations (e.g., pre-processing transformations 210 in FIG. 2), graph iterations are lowered (e.g., lower of graph iterations into queries 230 in FIG. 2) into an intermediate representation (IR) with a query-based structure (e.g., query intermediate representation 240 in FIG. 2). In an example, this representation is syntactically similar to a structured query language (SQL) with additional constructs defined (e.g., table iterators to explicate the heterogeneous nature of graphs, constructs to abstract over table names and graph structures). The IR serves to translate graph iteration into relational queries.

In an example, the transformation to lower a program into the query IR traverses the program tree in a bottom-up order and matches each graph iteration with the corresponding query. In an example, two types of queries are supported: aggregation queries and property update queries.

An aggregation query stores the result of an aggregation operation (e.g., sum, average, maximum, minimum) in a variable. The transformation for lowering an aggregation into a query takes the aggregation's building blocks, for example, the variable aggregated into, the aggregation operator, the iterator, the filter expression, the aggregation expression, and puts the aggregation building blocks into the corresponding position in the aggregation query.

Figure 7:
FIG. 7 is an example domain query obtained by translating an aggregation's iterator into its corresponding construct.

In an example, some of these blocks are lowered into query constructs. When present the filter expression can be translated into a WHERE clause. The domain query is obtained by translating the aggregation's iterator into its corresponding construct, as illustrated in FIG. 7.

Property update queries assign values to properties. In a property update, a data manipulation language (DML) statement is performed on the corresponding side table. In an example, for performance reasons, different update operators can be defined corresponding to different DML statements depending on the scenario.

Similar to aggregations, the transformation to lower a property update into a statement takes the property update's building blocks (e.g., the iterator, the filter expression, the property to be updated, the update expression) and puts them at the corresponding position in the property update query. When present, the filter expression can be translated to a WHERE clause. In an example, the presence or absence of a filter determines the property update type and thus the update operator to be used. In an example, if the iteration is filtered (e.g., MERGE INTO), the update is partial. If it is not filtered (e.g., TRUNCATE and INSERT), the update is global. If the update expression does not contain nested aggregations, the domain query is obtained by translating the property update's iterator into its corresponding construct. If the update expression contains nested aggregations, the domain query becomes a nested aggregation query as illustrated in FIG. 8.

In an example, the composition of property updates and aggregations (e.g., in the case of a property update query that performs a nested aggregation (e.g., using GROUP BY) of the neighbors of each vertex and uses the resulting value to update its property) can be supported. The aggregation can be computed per vertex and can be expressed with a GROUP BY statement.

Heterogeneous Operators

The exact definition of the graph will not be known until runtime. This causes additional complexity based on iterating over a graph with an unknown number of vertex and edge tables, and unknown schema, and unknown names. In an example, this difficulty is overcome by using name abstractions and loops for iterating over the different graph tables.

In an example, in the query-based intermediate representation (IR), the heterogeneous nature of the graph is maintained with the use of heterogeneous operators. For aggregations, the heterogeneous operator used can be UNION ALL because it represents a union over the tables with values that are to be aggregated and wraps the domain query in SQL. See, for example, the example code of FIG. 9.

For property updates, the heterogeneous operator used can be FOR ALL because it represents separate property updates per vertex or edge table and wraps the property update query in SQL. In SQL, this translates to separate DML statements per affected table. See, for example, the example code of FIG. 10.

Domain Queries

Domain queries specify the tables to be considered (e.g., the tables with side property to be updated, the tables with properties to be aggregated). Domain queries can either be an iteration over all vertices or edges of a graph, an iteration over the neighbors of a vertex, or a nested aggregation query. In an example, a global iteration over the vertices of edges of a graph can be matched with a SELECT query, which can be used to select vertex identifiers from a vertex table, V, an example of which is illustrated as 1110 in FIG. 11. Any size vertex table can be supported. For example, global graph iteration query 1120 in FIG. 11 is an example query for selecting vertex identifiers from the vertex table.

Neighbors of a vertex, v, are the vertices, w, connected to a vertex, v, through an edge, e, such that $$v-[e]\rightarrow w$$

in the case of an outgoing neighbor and $$v\leftarrow[e]-w$$

in the case of an incoming neighbor. In an example, neighbor iterations are mapped with an INNER JOIN between the neighbor vertex tables and the edge tables.

The join predicate in the query IR syntax (e.g., (_-(e: E)→ (w: D)) is transmitted to a regular SQL predicate that uses the correct join columns from the respective vertex and edge tables (a simple example of which is illustrated in FIG. 12 as table 1210). In an example, the columns and tables to be used are read from metadata that is passed at runtime. The code of FIG. 13 provides an example neighbor iteration query. In an example, a neighbor iteration nested in a vertex iteration is obtained by performing the right joins between source vertex tables, edge tables and destination vertex tables (a simple example of which is illustrated in FIG. 14).

To map vertex tables from the outer iteration to edge tables, two patterns can be utilized: 1) a LEFT OUTER JOIN pattern (that directly ensures that vertices without any edges connecting them to neighbors are also considered); and 2) an INNER JOIN+NOT IN pattern (where the INNER JOIN excludes vertices that do not occur in edge tables, that is vertices without neighbors, and the addition NOT IN query to consider the vertices without neighbors). Example code for a nested neighbor iteration is provided in FIG. 15. Example code for a nested aggregation using a LEFT OUTER JOIN is provided in FIG. 16. Example code for a nested aggregation using an INNER JOIN is provided in FIG. 17. Different databases, management systems and/or runtime workloads may benefit from one of the two patterns more than the other. Further, other system may be different and/or more efficient ways to express the logic.

The example code in FIGS. 18 and 19 illustrates a PageRank algorithm before and after a query IR translation as described above. The PageRank variant in FIG. 18 has undergone the preprocessing transformation described above to enable query IR translation. The iterations are single-issue and use explicit heterogenous iterators. In the PageRank variant in FIG. 19 all graph iterations have been lowered into queries and the rest of the PageRank algorithm is unchanged.

Code Generation

From the query IR generated as described above, relational database queries with procedural extensions are generated. In an example, graph iterations are matched with dynamic queries. FIG. 20 provides an example aggregation query. The translation turns the specific constructs that the query IR process introduces into valid queries. In the examples illustrated, SQL is the target query language and PL/SQL is an example of a procedural extension.

FIG. 21 provides an example property update query. In an example, property updates are mapped with DML statements. To improve performance, different DML statements can be used based on the type of update. For example, for an initial update where the property is assigned for the first time, in SQL, this can be translated into an INSERT INTO statement. In an example, for a global update, when the property is updated for every vertex or edge in the graph, in SQL a DELETE FROM statement followed by an INSERT INTO statement can be used. In an example, for a partial update where the property is updated for vertices or edges of a subset of the graph, in SQL a MERGE INTO statement can be used. In an example, the only operations allowed as nested iterations are aggregations. For example, a property with a nested aggregation could be written in SQL as a DML statement with an aggregation subquery.

Dynamic Queries

As mentioned above, the exact definition of the graph to be translated is now known until runtime. This results in the added complexity of iteration over an unknown number of vertex and edge tables and abstracting over table names. This can be addressed utilizing dynamic queries. Thus, the compilation approach described herein generates more than a simple template that is made executable by calls to a generic code generation API.

In an example, IR constructs like 'id (v)' are turned into PL/SQL code that reads the primary key columns from the graph metadata. Similarly, IR join conditions like 'v-[e]→_' are turned into the appropriate join condition, also by generating code that will look for this information in the metadata.

In an example, for each graph iteration, the compilation pattern described herein can generate two sub-procedures. First, a query generation procedure, and second, a query execution procedure. In an example, the query generation procedure generates the templates of the queries. In an example, the templates are called at the beginning of the main procedure to specialize the queries for the input graph at runtime. This gives queries runtime knowledge of table and column names and the number of vertex and edge tables for the graph.

In an example, query execution architectures execute the query, and are called at the graph iteration phase of the translation. In an example, queries are executed using an EXECUTE IMMEDIATE statement. FIG. 23 provides an example of generated PL/SQL code.

Heterogeneous Operators

Because the graph is heterogeneous (i.e., stored across multiple vertex and edge tables), the aggregations and property updates must consider all relevant tables. However, because the exact number of tables is not known until runtime, loops are generated for iterating over graph tables. In an example, for aggregations the aggregation is performed over a UNION-ALL of the relevant tables. This UNION ALL query is generated by a FOR-loop over the vertex tables, and this FOR-loop is the code produced by the approaches described herein.

FIG. 24 provides example code for an aggregation query with a heterogeneous operator. For property updates, the DML statements are stored in a list and executed in a loop. FIG. 25 provides example code for a property update query with a heterogeneous operator. FIG. 26 provides example generated procedural SQL code for the PageRank algorithm using the approach described (some parts of the code are omitted for conciseness).

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. A database command may be referred to herein as a query. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create, configure and define database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

An SQL statement includes one or more query blocks. A query block is the basic unit of a SQL statement that specifies a projection operation (e.g. columns specified in a SELECT clause) on a row source (i.e. table, inline view, view referenced by a FROM clause), and may specify additional operations on the row source such as joining and grouping. A query block may be nested within another "outer" query block. A nested query block may be a subquery or inline view. A query block may be an argument to the UNION clause along with another query block, as illustrated by SQL statements described earlier.

A database is defined by a database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access or execute the database objects that are defined by the dictionary. Such database objects may be referred to herein as first-class citizens of the database.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimization and Execution Plans

Query optimization generates one or more different candidate execution plans for a query, which are evaluated by the query optimizer to determine which execution plan should be used to compute the query.

Execution plans may be represented by a graph of interlinked nodes, each representing an plan operator or row sources. The hierarchy of the graphs (i.e., directed tree) represents the order in which the execution plan operators are performed and how data flows between each of the execution plan operators.

An operator, as the term is used herein, comprises one or more routines or functions that are configured for performing operations on input rows or tuples to generate an output set of rows or tuples. The operations may use interim data structures. Output set of rows or tuples may be used as input rows or tuples for a parent operator.

An operator may be executed by one or more computer processes or threads.

Referring to an operator as performing an operation means that a process or thread executing functions or routines of an operator are performing the operation.

A row source performs operations on input rows and generates output rows, which may serve as input to another row source. The output rows may be new rows, and or a version of the input rows that have been transformed by the row source.

A query optimizer may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and pushdown, common subexpression elimination, outer-to-inner join conversion, materialized view rewrite, and star transformation.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 27:
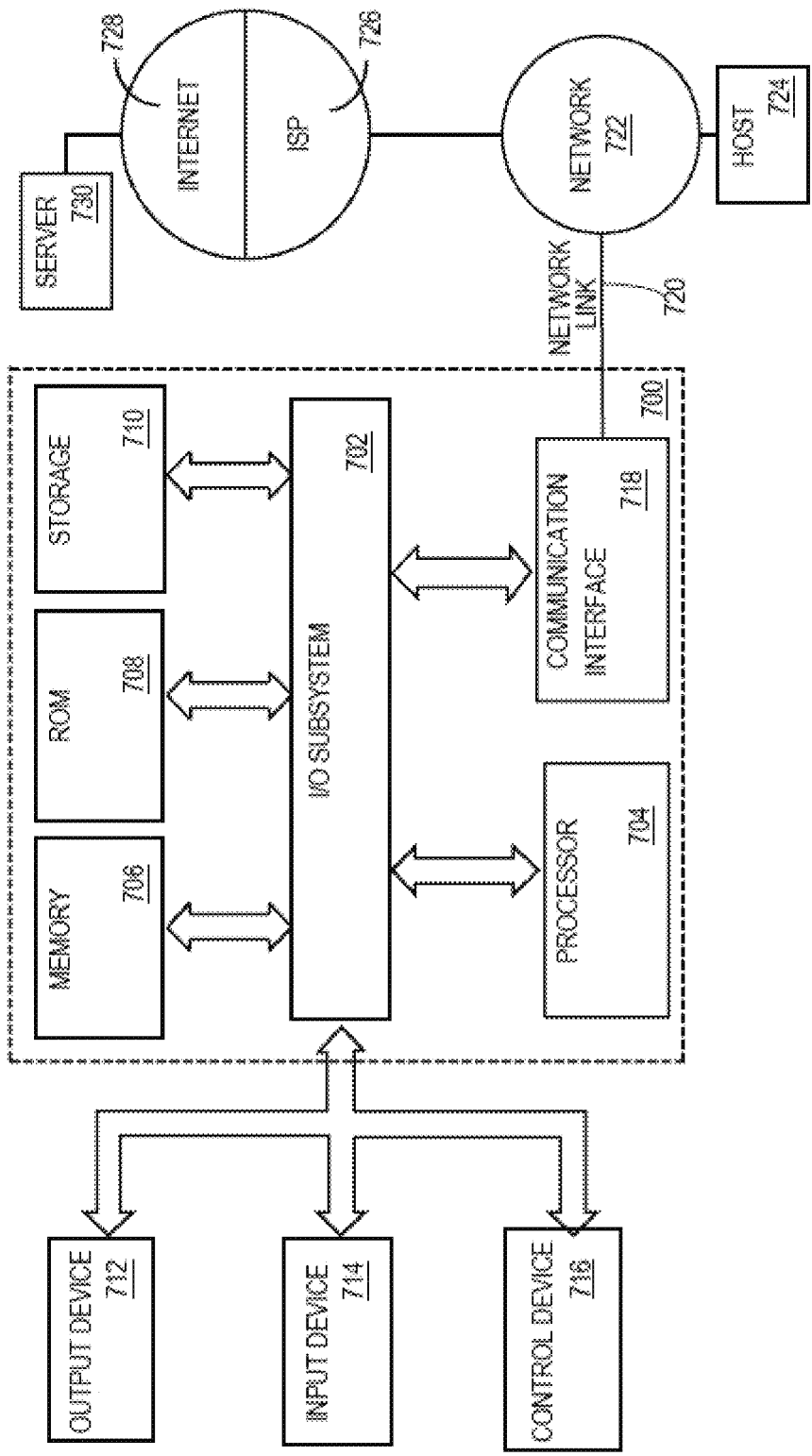
FIG. 27 is a block diagram that illustrates a computer system upon which an embodiment of the invention may be implemented.

For example, FIG. 27 is a block diagram that illustrates a computer system 2700 upon which an embodiment of the invention may be implemented. Computer system 2700 includes a bus 2702 or other communication mechanism for communicating information, and a hardware processor 2704 coupled with bus 2702 for processing information. Hardware processor 2704 may be, for example, a general-purpose microprocessor.

Computer system 2700 also includes a main memory 2706, such as a random-access memory (RAM) or other dynamic storage device, coupled to bus 2702 for storing information and instructions to be executed by processor 2704. Main memory 2706 also may be used for storing temporary variables or other intermediate information during execution of instructions to be executed by processor 2704. Such instructions, when stored in non-transitory storage media accessible to processor 2704, render computer system 2700 into a special-purpose machine that is customized to perform the operations specified in the instructions.

Computer system 2700 further includes a read only memory (ROM) 2708 or other static storage device coupled to bus 2702 for storing static information and instructions for processor 2704. A storage device 2710, such as a magnetic disk, optical disk, or solid-state drive is provided and coupled to bus 2702 for storing information and instructions.

Computer system 2700 may be coupled via bus 2702 to a display 2712, such as a cathode ray tube (CRT), for displaying information to a computer user. An input device 2714, including alphanumeric and other keys, is coupled to bus 2702 for communicating information and command selections to processor 2704. Another type of user input device is cursor control 2716, such as a mouse, a trackball, or cursor direction keys for communicating direction information and command selections to processor 2704 and for controlling cursor movement on display 2712. This input device typically has two degrees of freedom in two axes, a first axis (e.g., x) and a second axis (e.g., y), that allows the device to specify positions in a plane.

Computer system 2700 may implement the techniques described herein using customized hard-wired logic, one or more ASICs or FPGAs, firmware and/or program logic which in combination with the computer system causes or programs computer system 2700 to be a special-purpose machine. According to one embodiment, the techniques herein are performed by computer system 2700 in response to processor 2704 executing one or more sequences of one or more instructions contained in main memory 2706. Such instructions may be read into main memory 2706 from another storage medium, such as storage device 2710. Execution of the sequences of instructions contained in main memory 2706 causes processor 2704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 2710. Volatile media includes dynamic memory, such as main memory 2706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2702. Transmission media can also take the form of acoustic or light waves, such as those generated during radio-wave and infra-red data communications.

Various forms of media may be involved in carrying one or more sequences of one or more instructions to processor 2704 for execution. For example, the instructions may initially be carried on a magnetic disk or solid-state drive of a remote computer. The remote computer can load the instructions into its dynamic memory and send the instructions over a telephone line using a modem. A modem local to computer system 2700 can receive the data on the telephone line and use an infra-red transmitter to convert the data to an infra-red signal. An infra-red detector can receive the data carried in the infra-red signal and appropriate circuitry can place the data on bus 2702. Bus 2702 carries the data to main memory 2706, from which processor 2704 retrieves and executes the instructions. The instructions received by main memory 2706 may optionally be stored on storage device 2710 either before or after execution by processor 2704.

Computer system 2700 also includes a communication interface 2718 coupled to bus 2702. Communication interface 2718 provides a two-way data communication coupling to a network link 2720 that is connected to a local network 2722. For example, communication interface 2718 may be an integrated services digital network (ISDN) card, cable modem, satellite modem, or a modem to provide a data communication connection to a corresponding type of telephone line. As another example, communication interface 2718 may be a local area network (LAN) card to provide a data communication connection to a compatible LAN. Wireless links may also be implemented. In any such implementation, communication interface 2718 sends and receives electrical, electromagnetic or optical signals that carry digital data streams representing various types of information.

Network link 2720 typically provides data communication through one or more networks to other data devices. For example, network link 2720 may provide a connection through local network 2722 to a host computer 2724 or to data equipment operated by an Internet Service Provider (ISP) 2726. ISP 2726 in turn provides data communication services through the world wide packet data communication network now commonly referred to as the "Internet" 2728. Local network 2722 and Internet 2728 both use electrical, electromagnetic or optical signals that carry digital data streams. The signals through the various networks and the signals on network link 2720 and through communication interface 2718, which carry the digital data to and from computer system 2700, are example forms of transmission media.

Computer system 2700 can send messages and receive data, including program code, through the network(s), network link 2720 and communication interface 2718. In the Internet example, a server 2730 might transmit a requested code for an application program through Internet 2728, ISP 2726, local network 2722 and communication interface 2718.

The received code may be executed by processor 2704 as it is received, and/or stored in storage device 2710, or other non-volatile storage for later execution.

Software Overview

Figure 28:
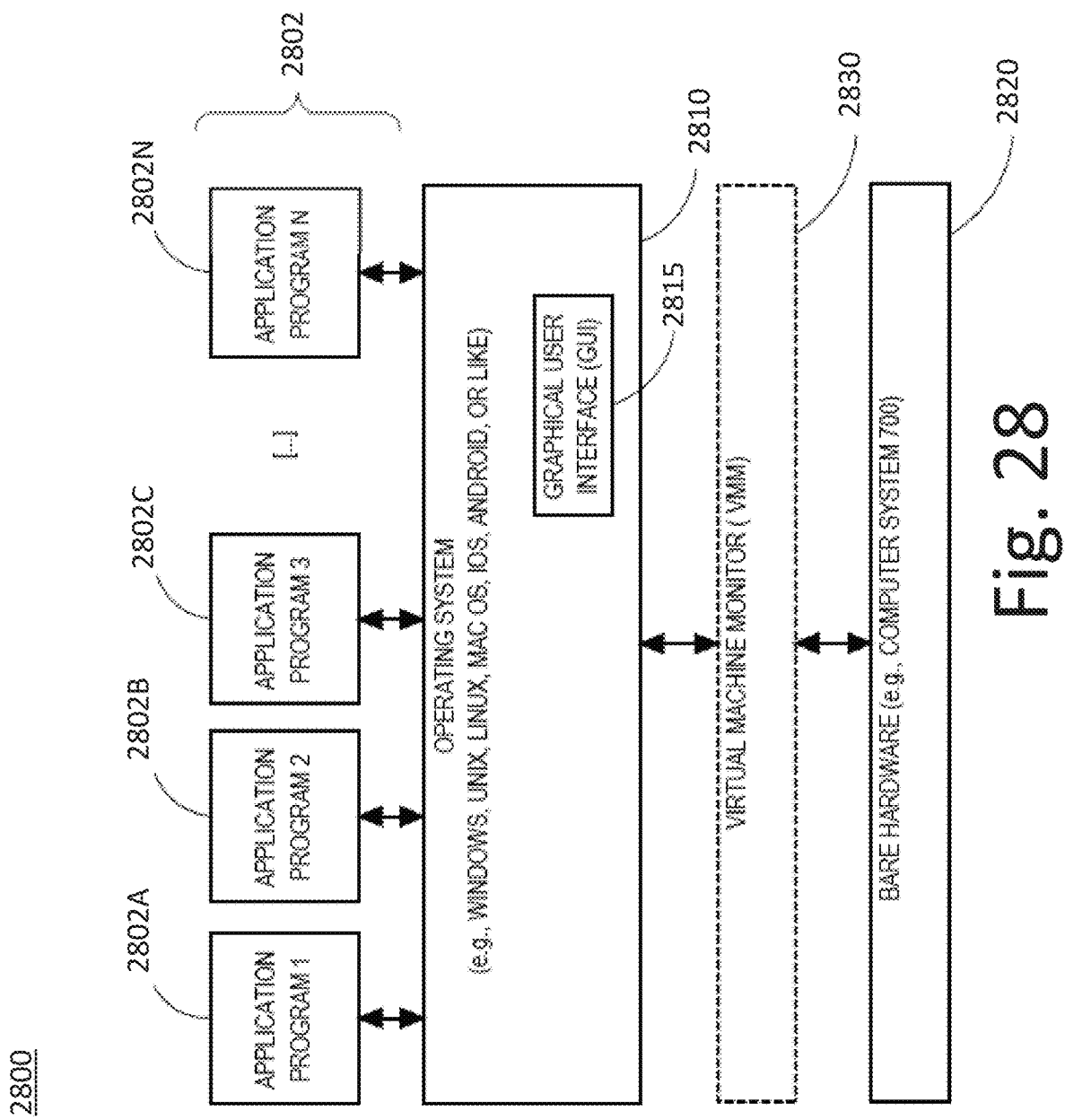
FIG. 28 is a block diagram of a basic software system that may be employed for controlling the operation of the computing device of FIG. 27.

FIG. 28 is a block diagram of a basic software system that may be employed for controlling the operation of the computing device of FIG. 27. Software system 2800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 2800 is provided for directing the operation of computing device 2700. Software system 2800, which may be stored in system memory (RAM) 2706 and on fixed storage (e.g., hard disk or flash memory) 2710, includes a kernel or operating system (OS) 2810.

The OS 2810 manages low-level aspects of computer operation, including managing execution of processes, memory allocation, file input and output (I/O), and device I/O. One or more application programs, represented as 2802A, 2802B, 2802C . . . 2802N, may be "loaded" (e.g., transferred from fixed storage 2710 into memory 2706) for execution by the system 800. The applications or other software intended for use on device 2800 may also be stored as a set of downloadable computer-executable instructions, for example, for downloading and installation from an Internet location (e.g., a Web server, an app store, or other online service).

Software system 2800 includes a graphical user interface (GUI) 2815, for receiving user commands and data in a graphical (e.g., "point-and-click" or "touch gesture") fashion. These inputs, in turn, may be acted upon by the system 2800 in accordance with instructions from operating system 2810 and/or application(s) 2802. The GUI 2815 also serves to display the results of operation from the OS 2810 and application(s) 2802, whereupon the user may supply additional inputs or terminate the session (e.g., log off).

OS 2810 can execute directly on the bare hardware 2820 (e.g., processor(s) 2704) of device 2700. Alternatively, a hypervisor or virtual machine monitor (VMM) 2830 may be interposed between the bare hardware 2820 and the OS 2810. In this configuration, VMM 2830 acts as a software "cushion" or virtualization layer between the OS 2810 and the bare hardware 2820 of the device 2700.

VMM 2830 instantiates and runs one or more virtual machine instances ("guest machines"). Each guest machine comprises a "guest" operating system, such as OS 2810, and one or more applications, such as application(s) 2802, designed to execute on the guest operating system. The VMM 2830 presents the guest operating systems with a virtual operating platform and manages the execution of the guest operating systems.

In some instances, the VMM 2830 may allow a guest operating system to run as if it is running on the bare hardware 2820 of device 2700 directly. In these instances, the same version of the guest operating system configured to execute on the bare hardware 2820 directly may also execute on VMM 2830 without modification or reconfiguration. In other words, VMM 2830 may provide full hardware and CPU virtualization to a guest operating system in some instances.

In other instances, a guest operating system may be specially designed or configured to execute on VMM 2830 for efficiency. In these instances, the guest operating system is "aware" that it executes on a virtual machine monitor. In other words, VMM 2830 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
   performing one or more preprocessing transformations that enforce restrictions on a high-level domain-specific language (DSL) input to generate one or more graph iterations, wherein the one or more graph iterations comprise building blocks;
   generating at least one query intermediate representation (IR) by lowering the one or more graph iterations into at least one query construct, wherein lowering the one or more graph iterations into the at least one query comprises putting the building blocks of the one or more graph iterations into respective corresponding positions in the at least one query construct;
   mapping the query IR to one or more corresponding relational queries with procedural extensions; and running the relational queries with procedural extensions against relational database management system (RDBMS) tables representing at least one property graph;

wherein the method is performed by one or more computing devices.

2. The method of claim 1 wherein translating the DSL input into relational queries with procedural extensions comprises processing of property updates and aggregations within the property graph.

3. The method of claim 1 wherein the one or more graph iterations comprise at least iterations for property updates where the iterations for the property updates occur over the structure of a graph, or a subset of the graph and the result is one or more updates to a value of a property assigned for at least one vertex or edge.

4. The method of claim 3 wherein the property updates come from a nested aggregation.

5. The method of claim 3 wherein name abstractions and loops for are used during the one or more graph iterations over graph tables corresponding to the property updates.

6. The method of claim 1 wherein the one or more graph iterations comprise at least iterations for aggregations where reduction operations are performed over vertices or edges of a graph or subset of the graph and the result is stored as a scalar variable.

7. The method of claim 6 wherein name abstractions and loops for are used during the one or more graph iterations over graph tables corresponding to the aggregations.

8. The method of claim 1 wherein the preprocessing transformations comprise at least transforming an operation in the DSL input corresponding to multiple property updates to parallel iterations to perform one property update each.

9. The method of claim 1 wherein the query IR is syntactically similar to a structured query language (SQL) query and includes additional constructs defined.

10. The method of claim 1 wherein the relational queries with procedural extensions comprise a graph-specific table structure based on information extracted from graph metadata.

11. One or more non-transitory storage media storing instructions which, when executed by one or more computing devices, cause performance of the method recited in claim 1.

12. A method comprising performing a machine-executed operation involving instructions, wherein said instructions are instructions which, when executed by one or more computing devices, cause performance of certain steps including:

performing one or more preprocessing transformations that enforce restrictions on a high-level domain-specific language (DSL) input to generate one or more graph iterations, wherein the one or more graph iterations comprise building blocks;

generating at least one query intermediate representation (IR) by lowering the one or more graph iterations into at least one query construct, wherein lowering the one or more graph iterations into the at least one query comprises putting the building blocks of the one or more graph iterations into respective corresponding positions in the at least one query construct;

mapping the query IR to one or more corresponding relational queries with procedural extensions; and running the relational queries with procedural extensions against relational database management system (RDBMS) tables representing at least one property graph;

wherein the machine-executed operation is at least one of (a) sending said instructions, (b) receiving said instructions, (c) storing said instructions, or (d) executing said instructions.

13. The method of claim 12 wherein translating the DSL input into relational queries with procedural extensions comprises processing of property updates and aggregations within the property graph.

14. The method of claim 12 wherein the one or more graph iterations comprise at least iterations for property updates where the iterations for the property updates occur over the structure of a graph, or a subset of the graph and the result is one or more updates to a value of a property assigned for at least one vertex or edge.

15. The method of claim 14 wherein name abstractions and loops for are used during the one or more graph iterations over graph tables corresponding to the property updates.

16. The method of claim 12 wherein the one or more graph iterations comprise at iterations for aggregations where reduction operations are performed over vertices or edges of a graph or subset of the graph and the result is stored as a scalar variable.

17. The method of claim 16 wherein name abstractions and loops for are used during the one or more graph iterations over graph tables corresponding to the aggregations.

18. The method of claim 12 wherein the preprocessing transformations comprise at least transforming an operation in the DSL input corresponding to multiple property updates to parallel iterations to perform one property update each.

19. The method of claim 12 wherein the relational queries with procedural extensions comprise a graph-specific table structure based on information extracted from graph metadata.

20. The method of claim 12 wherein the relational queries comprise heterogeneous operators.

* * * * *

UNITED STATES PATENT AND TRADEMARK OFFICE
CERTIFICATE OF CORRECTION

PATENT NO. : 12,367,194 B1
APPLICATION NO. : 18/418718
DATED : July 22, 2025
INVENTOR(S) : Kapp et al.

It is certified that error appears in the above-identified patent and that said Letters Patent is hereby corrected as shown below:

On the Title Page

On page 3, Column 1, under item (56) Other Publications, Line 53, delete "23d" and insert -- 23rd --, therefor.

On page 3, Column 1, under item (56) Other Publications, Line 54, delete "Compliation" and insert -- Compilation --, therefor.

On page 3, Column 2, under item (56) Other Publications, Line 10, delete "Reconfgurable" and insert -- Reconfigurable --, therefor.

On page 4, Column 2, under item (56) Other Publications, Line 4, delete "Multingual" and insert -- Multilingual --, therefor.

In the Drawings

On sheet 21 of 22, in Fig. 27, under reference numeral 712, Line 2, delete "712" and insert -- 2712 --, therefor.

On sheet 21 of 22, in Fig. 27, under reference numeral 714, Line 2, delete "714" and insert -- 2714 --, therefor.

On sheet 21 of 22, in Fig. 27, under reference numeral 716, Line 2, delete "716" and insert -- 2716 --, therefor.

On sheet 21 of 22, in Fig. 27, under reference numeral 706, Line 2, delete "706" and insert -- 2706 --, therefor.

Signed and Sealed this
Thirtieth Day of December, 2025

John A. Squires
*Director of the United States Patent and Trademark Office*

On sheet 21 of 22, in Fig. 27, under reference numeral 708, Line 2, delete "708" and insert -- 2708 --, therefor.

On sheet 21 of 22, in Fig. 27, under reference numeral 710, Line 2, delete "710" and insert -- 2710 --, therefor.

On sheet 21 of 22, in Fig. 27, under reference numeral 702, Line 2, delete "702" and insert -- 2702 --, therefor.

On sheet 21 of 22, in Fig. 27, under reference numeral 704, Line 2, delete "704" and insert -- 2704 --, therefor.

On sheet 21 of 22, in Fig. 27, under reference numeral 718, Line 3, delete "718" and insert -- 2718 --, therefor.

On sheet 21 of 22, in Fig. 27, under reference numeral 700, Line 8, delete "700" and insert -- 2700 --, therefor.

On sheet 21 of 22, in Fig. 27, under reference numeral 730, Line 2, delete "730" and insert -- 2730 --, therefor.

On sheet 21 of 22, in Fig. 27, under reference numeral 728, Line 1, delete "728" and insert -- 2728 --, therefor.

On sheet 21 of 22, in Fig. 27, under reference numeral 726, Line 2, delete "726" and insert -- 2726 --, therefor.

On sheet 21 of 22, in Fig. 27, under reference numeral 720, Line 2, delete "720" and insert -- 2720 --, therefor.

On sheet 21 of 22, in Fig. 27, under reference numeral 722, Line 2, delete "722" and insert -- 2722 --, therefor.

On sheet 21 of 22, in Fig. 27, under reference numeral 724, Line 2, delete "724" and insert -- 2724 --, therefor.

In the Specification

In Column 3, Line 37, delete "aggregation" and insert -- aggregation. --, therefor.

In Column 5, Line 67, delete "in side" and insert -- inside --, therefor.

In Column 8, Line 52, delete "v–[e]→w" and insert -- v–[e]->w --, therefor.

CERTIFICATE OF CORRECTION (continued)
U.S. Pat. No. 12,367,194 B1

In Column 8, Line 55, delete "v←[e]–w" and insert -- v<-[e]–w --, therefor.

In Column 8, Lines 59-60, delete "(_–(e: E)→ (w: D))" and insert -- (_–(e: E)->(w: D)) --, therefor.

In Column 9, Line 62, delete "'id (v)'" and insert -- 'id(v)' --, therefor.

In Column 9, Line 64, delete "'v-[e]→_'" and insert -- 'v-[e]->_' --, therefor.

In Column 11, Line 66, delete "(i.e., java" and insert -- (i.e. .java --, therefor.

In Column 11, Line 67, delete "(i.e., class" and insert -- (i.e. .class --, therefor.

In Column 12, Line 42, delete "and or" and insert -- and/or --, therefor.